United States Patent
Wieske

[15] 3,681,404
[45] Aug. 1, 1972

[54] PROCESS FOR THE PREPARATION OF 5-BROMO-6-FLUORO-STEROIDS

[72] Inventor: Reinhold Wieske, Berlin, Germany

[73] Assignee: Schering Aktiengesellschaft, Berlin, Germany

[22] Filed: March 27, 1970

[21] Appl. No.: 23,456

[30] Foreign Application Priority Data

March 29, 1969 Germany ..........P 19 16 823.1

[52] U.S. Cl. ........260/397.4, 260/397.47, 260/397.5
[51] Int. Cl.............................................C07c 169/34
[58] Field of Search ....... Machine Searched Steroids

[56] References Cited

UNITED STATES PATENTS 3,173,914   3/1965   Bowers....................260/239.55

*Primary Examiner*—Henry A. French
*Attorney*—Millen, Raptes and White

[57] ABSTRACT

5-Bromo-6-fluoro steroids are produced by the bromine-fluorine addition to the double bond of a $\Delta^5$-unsaturated steroid using an N-bromoacylamide or N-bromoimide and aqueous hydrogen fluoride. A novel steroid produced by the process is 6$\beta$-fluoro-5$\alpha$-bromo-3$\beta$,17$\beta$-dihydroxy-androstane.

8 Claims, No Drawings

PROCESS FOR THE PREPARATION OF 5-BROMO-6-FLUORO-STEROIDS

BACKGROUND OF THE INVENTION

According to German Pat. No. 1,200,813 and U.S. Pat. No. 3,173,914, 5-bromo-6-fluoro steroids of the pregnane and androstane series can be produced by the bromine-fluorine addition to the double bond of corresponding $\Delta^5$-unsaturated starting steroids at temperatures below 0° C. using N-bromoacylamide or -imide and anhydrous hydrogen fluoride in the presence of ethers or ketones as proton acceptors. In order to obtain satisfactory yields, a precise molar ratio of proton acceptor/hydrogen fluoride must be maintained. For industrial applications, such a process has the disadvantages that low temperatures must be maintained and that a fixed ratio of concentration of a volatile reactant must be maintained. Also, on a commercial scale, conducting the reaction under anhydrous conditions and producing the fluorinating agent from hydrogen fluoride gas and a carboxylic acid amide presents difficulties.

The process of this invention is distinguished by a surprisingly simple mode of operation which is especially suited for industrial application. It has the advantage over the process of the prior art in that it is unnecessary to employ an anhydrous reaction medium.

SUMMARY OF THE INVENTION

According to this invention, $5\alpha$-bromo-$6\beta$-fluoro steroids are produced by the bromine-fluorine addition to the double bond of a $\Delta^5$-unsaturated steroid using an N-bromoacylamide or N-bromoimide and aqueous hydrofluoric acid.

DETAILED DISCUSSION

That the product of the process of this invention would be a $5\alpha$-bromo-$6\beta$-fluoro steroid could not be predicted because it is known that the N-bromoacylamides or N-bromoimides in an aqueous acidic solution form bromohydrins which are reactive to olefinic double bonds.

In carrying out the process of this invention, the starting $\Delta^5$-unsaturated steroid, dissolved in an inert solvent, is mixed successively with the selected N-bromoacylamide or -imide, and aqueous hydrofluoric acid, in either sequence.

Suitable inert solvents are liquid-saturated aliphatic and alicyclic and aromatic hydrocarbons, which can also be halogenated, such as, for example methylene chloride, ethylene dichloride, chloroform, hexane, octane, cyclohexane, methylcyclohexane, benzene, toluene, xylene, etc.

In contradistinction to the process of the prior art, the reaction solvent need not comprise a proton acceptor, e.g., a hydrocarbon ether or ketone. Therefore, the reaction solvent is preferably, although not necessarily, free of hydrocarbon ethers and ketones.

The reaction is conducted at any convenient temperature, e.g., −70° C. to room temperature, preferably about −50° to +15° C. In contradistinction to the prior art process, the temperature need not be maintained below 0° C. However, heating above room temperature is not usually desirable and some cooling usually is employed to maintain the reaction temperature preferably at 15° C. or lower.

The reaction is conducted until the bromination-fluorination of the $\Delta^5$-double bond of the starting steroid is substantially complete, e.g., from a few minutes to several hours or longer, usually about 10 to 45 minutes.

The bromine is supplied by a source of positive halogen, e.g., N-bromoamides and N-bromoimides which preferably are derivatives of mono- and dicarboxylic acids, respectively, containing up to 20 carbon atoms. Includes are those of the following formulae:

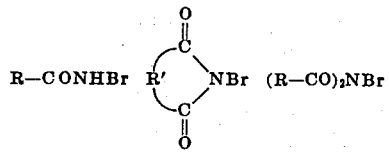

wherein R is a monovalent and R' is a divalent saturated or unsaturated hydrocarbon radical of less than 20 carbon atoms. Specific examples are the N-bromoderivatives of acetamide, propionamide, n-butyramide, isobutyramide, palmitamide, succinimide, phthalimide, benzamide and p-toluenamide.

The amount of N-bromo compound employed is about 1.0 to 2.0, preferably about 1.1 molar equivalents, calculated on the starting steroid. Especially suitable as the bromination reactant are N-bromosuccinimide and N-bromoacetamide.

In the process of this invention, the hydrogen fluoride, in the form of hydrofluoric acid, is employed in at most only a minor excess, so that, during the neutralization which follows the bromination-fluorination reaction, less neutralizing agent is required than in the conventional processes. Usually about 5–10 molar equivalent, calculated on the starting steroid, of hydrofluoric acid is employed. The concentration of the acid is not critical and can vary, e.g., from about 50 to 90 percent. A concentration of about 70 to 80 percent is preferred.

The order of mixing of the N-bromo compound and the hydrofluoric acid with the starting steroid is not critical. However, the hydrofluoric acid is preferably added first.

The $\Delta^5$-unsaturated compounds of the process of this invention are cyclopentane-phenanthrenes having a double bond between the $C_5$ and $C_6$ carbon atoms. Included are the gonanes, either lacking angular methyl groups on the $C_{10}$ and/or $C_{13}$ carbon atoms, or having in lieu thereof a polycarbon atom radical, e.g., ethyl, propyl, isopropyl; the pregnanes; the 19-norpregnanes; androstanes; 19-norandrostanes; bisnorcholanes; norcholanes; cholanes; sitostanes; etc. Included are the unsaturated steroids disclosed as starting materials for the process of U.S. Pat. No. 3,173,914 (Col. 2, line 18 to Col. 3, line 2). Especially useful are steroids of the pregnane series having $\alpha$- or $\beta$-hydroxy, $\alpha$- or $\beta$-acyloxy, $\alpha$- or $\beta$-alkoxy or benzyloxy, keto or ketalized keto at the 3-position; $\alpha$-H or $\alpha$-F at the 9-position; $H_2$, $\alpha$-OH, $\beta$-OH or keto at the 11-position; H, $CH_3$ or $C_2H_5$ at the 13-position; H, $\alpha$-OH, $\alpha$- or $\beta$-$CH_3$ at the 16-position; $\alpha$-H, $\alpha$-OH, $\alpha$-acyloxy at the 17-position; keto or ketalized keto at the 20-position; and H, hydroxy or acyloxy at the 21-position; steroids of the androstane series having like substituents at the 3, 9, 11, 13, 16 and 17-positions; and steroids of the estrane series having like substituents at the 9, 11, 13, 16, and 17-positions and hydroxy, alkoxy or acyloxy group at the 3-position. Especially useful starting materials are those of the formula

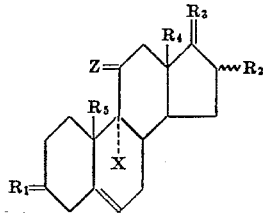

(I)

wherein $R_1 = 0$, ketalized keto,

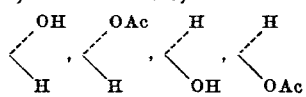

$R_2$ is H, $\alpha$- or $\beta$-$CH_3$, —OH; $R_3 = 0$,

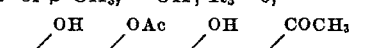

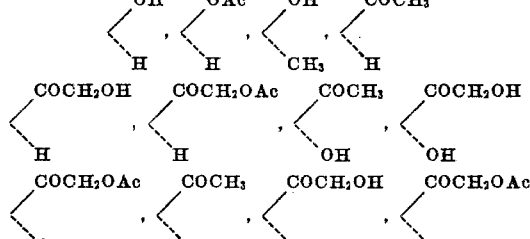

$R_4$ and $R_5$ are H, $CH_3$ or $C_2H_5$; X is H or F and $Z=0$,

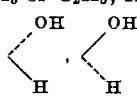

wherein Ac in each instance is the radical of an organic carboxylic acid, preferably containing 1–12 carbon atoms, e.g., acetate, propionate, butyrate, trimethylacetate, valerate, benzoate, cyclopentylpropionate, etc.

in each instance is the radical of an organic carboxylic acid, preferably containing one–12 carbon atoms, e.g., acetate, propionate, butyrate, trimethylacetate, valerate, benzoate, cyclopentylpropionate, etc.

The reaction product is worked up in the usual fashion, e.g., by mixing with ice water optionally containing sufficient base, e.g., sodium carbonate or sodium bicarbonate, to neutralize the acid in the reaction mixture; separating the organic phase, removing the solvent and recrystallizing the product.

The products of the process are valuable intermediates for the preparation of known, therapeutically highly effective 6$\alpha$-fluoro-3-keto-$\Delta^4$-steroids, wherein the introduction of the 3-keto-$\Delta^4$-group by oxidizing the 3-hydroxy group and splitting off the 5$\alpha$-bromine atom, as well as the isomerization of the fluorine atom in the 6$\beta$-position into the 6$\alpha$-configuration are conducted in a conventional manner.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Ten g. of 3$\beta$-hydroxy-21-acetoxy-16$\alpha$-methyl-5-pregnen-20-one is dissolved in 100 ml. of methylene chloride. The solution is cooled to –40° C. Under stirring, 7.14 ml. of 70 percent aqueous hydrofluoric acid and then 5.1 g. of N-bromosuccinimide are added thereto, and the mixture is agitated for 30 minutes at –35° C. The reaction solution is introduced into a solution of 33.3 g. of potassium bicarbonate in 175 ml. of water. The methylene chloride phase is separated, washed neutral with water, filtered, and concentrated to dryness under a vacuum. The crude product is recrystallized from methanol, thus obtaining 8.6 g. of 6$\beta$-fluoro-5$\alpha$-bromo-3$\beta$-hydroxy-21-acetoxy-16$\alpha$-methyl-pregnan-20-one, m.p. 175°/176° 177° C. (decomposition); $[\alpha]_D = -4.6°$ (chloroform).

EXAMPLE 2

Ten g. of 3$\beta$-hydroxy-5-pregnen-20-one is suspended in 100 ml. of methylene chloride at –40°C. To the suspension is added 8.73 ml. of 70 percent aqueous hydrofluoric acid and thereafter 6.25 g. of N-bromosuccinimide is added thereto, within a period of 5 minutes. The reaction mixture is stirred for 30 minutes at –35° C. The reaction solution is poured into a solution of 40.8 g. of potassium bicarbonate in 215 ml. of water, and worked up analogously to Example 1. The crude product is recrystallized from methylene chloride, thus obtaining 8.8 g. of 6$\beta$-fluoro-5$\alpha$-bromo-3$\beta$-hydroxy-pregnan-20-one, m.p. 170°– 172° C. (decomposition); $[\alpha]_D = +5.0°$ (chloroform).

EXAMPLE 3

Ten g. of 3$\beta$, 17$\beta$-dihydroxy-5-androstene is suspended in 100 ml. of methylene chloride. The suspension is cooled to –40° C., and 9.54 ml. of 70 percent aqueous hydrofluoric acid and then 6.82 g. of N-bromosuccinimide are added thereto. The reaction mixture is stirred for 30 minutes at –35° C. A solution of 44.5 g. of potassium bicarbonate in 234 ml. of water is added to the reaction mixture. After working the mixture up in the usual manner, 7.74 g. of 6$\beta$-fluoro-5$\alpha$-bromo-3$\beta$,17$\beta$-dihydroxy-androstane is obtained which is crystallized from methylene chloride, m.p. 135°/6°137° C. (decomposition); $[\alpha]_D = -55.8°$ (chloroform).

EXAMPLE 4

Two hundred and fifty ml. of methylene chloride and 20 ml. of 75 percent aqueous hydrofluoric acid are mixed and added within 10 minutes, under stirring and at 5°–10° C., to a solution of 30 g. of 3$\beta$-hydroxy-21-acetoxy-16$\alpha$-methyl-5-pregnen-20-one in 120 ml. of methylene chloride. Thereafter, 15.2 g. of N-bromosuccinimide is added in batches under stirring and at +10° C. within 5 minutes, and the reaction mixture is stirred for another 30 minutes at +10° C. The reaction mixture is then introduced into a solution of 100 g. of potassium bicarbonate in 525 ml. of water. The methylene chloride phase is separated, washed with water, filtered, and concentrated to dryness under a vacuum. After recrystallizing the crude product from methanol, 8.15 g. of 6$\beta$-fluoro-5$\alpha$-bromo-3$\beta$-hydroxy-21-acetoxy-16$\alpha$-methyl-pregnan-20-one is obtained, m.p. 176°–177° C. (decomposition); $[\alpha]_D = -3.0°$ (chloroform).

EXAMPLE 5

Ten g. of 3$\beta$-hydroxy-21-acetoxy-16$\alpha$-methyl-5-pregnen-20-one is dissolved in 50 ml. of methylene chloride. The solution is cooled to +5° C., and 5.1 g. of N-bromosuccinimide is added under stirring. After 5 minutes, 6.25 ml. of 80 percent aqueous hydrofluoric acid is added within a 5 minute period. By cooling the reaction mixture, the temperature is not allowed to rise above 15° C. Stirring is continued at 15° C. for 15 minutes. In order to neutralize the reaction solution, it is mixed with a solution of 33.3 g. of potassium bicarbonate in 175 ml. of water and worked up analogously to Example 4. The crude product is recrystallized from methanol and yields 8.2 g. 6$\beta$-fluoro-5$\alpha$-bromo-3$\beta$-hydroxy-21-acetoxy-16$\alpha$-methyl-pregnan-20-one, m.p. 169°–172° C. (decomposition); $[\alpha]_D = -2.1°$ (chloroform).

EXAMPLE 6

To a solution of 10 g. of 3$\beta$-hydroxy-5-pregnen-20-one in 80 ml. of chloroform are added at +10° C., 8.73 ml. of 70 percent aqueous hydrofluoric acid and then 4.8 g. of N-bromoacetamide. The reaction mixture is agitated for 30 minutes at +10° C. The reaction solution is poured into a solution of 40.8 g. of potassium bicarbonate in 215 ml. of water and worked up as usual. The crude product is recrystallized from methylene chloride to give 8.75 g. of 6$\beta$-fluoro-5$\alpha$-bromo-3$\beta$-hydroxy-pregnan-20-one, m.p. 168°–170° C. (decomposition); $[\alpha]_D = +4.8°$ (chloroform).

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of 5$\alpha$-bromo-6$\beta$-fluoro-steroids by bromine-fluoride addition to the double bond of a $\Delta^5$-steroid of the androstane or pregnane series with hydrogen fluoride in the presence of an N-bromo-acylamide or -imide, the improvement which comprises using aqueous hydrofluoric acid in an ether- and ketone-free solvent and conducting at least a portion of the reaction at above 0° C.

2. A process according to claim 1 wherein the reaction is conducted above 0° C.

3. A process according to claim 1 wherein the reaction solvent is selected from the group consisting of hydrocarbons and chlorinated hydrocarbons.

4. A process according to claim 3 wherein the reaction solvent is methylene chloride.

5. A process according to claim 1 wherein the N-halo compound is selected from the group consisting of N-bromosuccinimide and N-bromoacetamide.

6. A process according to claim 2 wherein the reaction solvent is selected from the group consisting of hydrocarbons and chlorinated hydrocarbons.

7. A process according to claim 1 wherein the steroid is of the pregnane series.

8. A process according to claim 1 wherein the steroid is of the androstane series.

* * * * *